United States Patent
Filippo et al.

(10) Patent No.: US 7,836,259 B1
(45) Date of Patent: Nov. 16, 2010

(54) PREFETCH UNIT FOR USE WITH A CACHE MEMORY SUBSYSTEM OF A CACHE MEMORY HIERARCHY

(75) Inventors: Michael A. Filippo, Manchaca, TX (US); James K. Pickett, Austin, TX (US); Roger D. Isaac, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 408 days.

(21) Appl. No.: 10/817,693

(22) Filed: Apr. 2, 2004

(51) Int. Cl.
*G06F 13/28* (2006.01)

(52) U.S. Cl. .................................... 711/137

(58) Field of Classification Search ....................... None
See application file for complete search history.

(56) References Cited

U.S. PATENT DOCUMENTS

| 6,571,318 B1* | 5/2003 | Sander et al. ............... 711/137 |
| 6,968,430 B1 | 11/2005 | Kashyap |
| 2001/0016897 A1* | 8/2001 | Bates et al. ................. 711/137 |
| 2003/0105938 A1* | 6/2003 | Cooksey et al. ............. 711/203 |
| 2005/0268039 A1 | 12/2005 | Archambault et al. |

* cited by examiner

*Primary Examiner*—Tuan V Thai
*Assistant Examiner*—Duc T Doan
(74) *Attorney, Agent, or Firm*—Meyertons, Hood, Kivlin, Kowert & Goetzel, P.C.; Stephen J. Curran (57) ABSTRACT

A prefetch unit for use with a cache subsystem. The prefetch unit includes a stream storage coupled to a prefetch unit. The stream storage may include a plurality of locations configured to store a plurality of entries each corresponding to a respective range of prefetch addresses. The prefetch control may be configured to prefetch an address in response to receiving a cache access request including an address that is within the respective range of prefetch addresses of any of the plurality of entries.

12 Claims, 5 Drawing Sheets

PREFETCH UNIT FOR USE WITH A CACHE MEMORY SUBSYSTEM OF A CACHE MEMORY HIERARCHY

BACKGROUND OF THE INVENTION

1. Field of the Invention

This invention relates to microprocessors and, more particularly, to cache prefetch mechanisms.

2. Description of the Related Art

Memory latency is frequently a large factor in determining the performance (e.g. instructions executed per second) of a processor in a given computer system. Over time, the operating frequencies of processors have increased dramatically, while the latency for access to dynamic random access memory (DRAM) in the typical computer system has not decreased as dramatically. Additionally, transmitting memory requests from the processor to the memory controller coupled to the memory system also requires time, which increases the memory latency. Accordingly, the number of processor clocks required to access the DRAM memory has increased, from latencies (as measured in processor clocks) of a few processor clocks, through tens of processor clocks, to over a hundred processor clocks in modern computer systems.

Processors have implemented caches to combat the effects of memory latency on processor performance. Caches are relatively small, low latency memories incorporated into the processor or coupled nearby. The caches store recently used instructions and/or data under the assumption that the recently used information may be accessed by the processor again. The caches may thus reduce the effective memory latency experienced by a processor by providing frequently accessed information more rapidly than if the information had to be retrieved from the memory system in response to each access.

If processor memory requests (e.g. instruction fetches and load and store memory operations) are cache hits (the requested information is stored in the processor's cache), then the memory requests are not transmitted to the memory system. Accordingly, memory bandwidth may be freed for other uses. However, the first time a particular memory location is accessed, a cache miss occurs (since the requested information is stored in the cache after it has been accessed for the first time) and the information is transferred from the memory system to the processor (and may be stored in the cache). Additionally, since the caches are finite in size, information stored therein may be replaced by more recently accessed information. If the replaced information is accessed again, a cache miss will occur. The cache misses then experience the memory latency before the requested information arrives.

One way that the memory bandwidth may be effectively utilized is to predict the information that is to be accessed soon and to prefetch that information from the memory system into the cache. If the prediction is correct, the information may be a cache hit at the time of the actual request and thus the effective memory latency for actual requests may be decreased. Alternatively, the prefetch may be in progress at the time of the actual request, and thus the latency for the actual request may still be less than the memory latency even though a cache hit does not occur for the actual request. On the other hand, if the prediction is incorrect, the prefetched information may replace useful information in the cache, causing more cache misses to be experienced than if prefetching were not employed and thus increasing the effective memory latency. This is referred to as polluting the cache.

SUMMARY OF THE INVENTION

Various embodiments of a prefetch unit for use with a cache subsystem are disclosed. In one embodiment, the prefetch unit includes a stream storage coupled to a prefetch unit. The stream storage may include a plurality of locations configured to store a plurality of entries each corresponding to a respective range of prefetch addresses. The prefetch control may be configured to prefetch an address in response to receiving a cache access request including an address that is within the respective range of prefetch addresses of any of the plurality of entries.

In one specific implementation, each of the plurality of entries includes a next address indicative of a prefetch starting address, a prefetch depth value indicative of a number of bytes to prefetch and a prefetch distance value indicative of number of bytes ahead of a last address prefetched during a last prefetch cycle. In addition, the prefetch control may be further configured to dynamically adjust the prefetch depth value dependent upon a confidence count which is indicative of an accuracy of preceding prefetches. Further, the prefetch control may be further configured to dynamically adjust the prefetch distance value dependent upon whether an outstanding prefetch exists during a subsequent prefetch cycle.

In another specific implementation, the prefetch control may be further configured to initialize a new entry of the plurality of entries and to establish a training address using an address corresponding to a first cache access request not matching any of the plurality of entries in response to receiving a miss indication corresponding to said first cache access request. In addition, the prefetch control may be further configured to determine whether each of the plurality of entries is a valid address stream based upon a history of previous cache access requests each corresponding to a respective miss indication. Further, each of the plurality of entries may be determined to be a valid address stream in response to a predetermined number of the previous cache access requests having addresses that are within a predetermined range of addresses from the training address.

In another embodiment, a microprocessor is contemplated in which the microprocessor includes a cache subsystem coupled to a prefetch unit. The cache subsystem may include a cache storage configured to store a plurality of cache lines. The prefetch unit may include a stream storage including a plurality of locations configured to store a plurality of entries each corresponding to a respective range of prefetch addresses. The prefetch unit may further include a prefetch control coupled to the stream storage and configured to prefetch an address in response to receiving a cache access request to the cache storage including an address that is within the respective range of prefetch addresses of any of the plurality of entries.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 1:
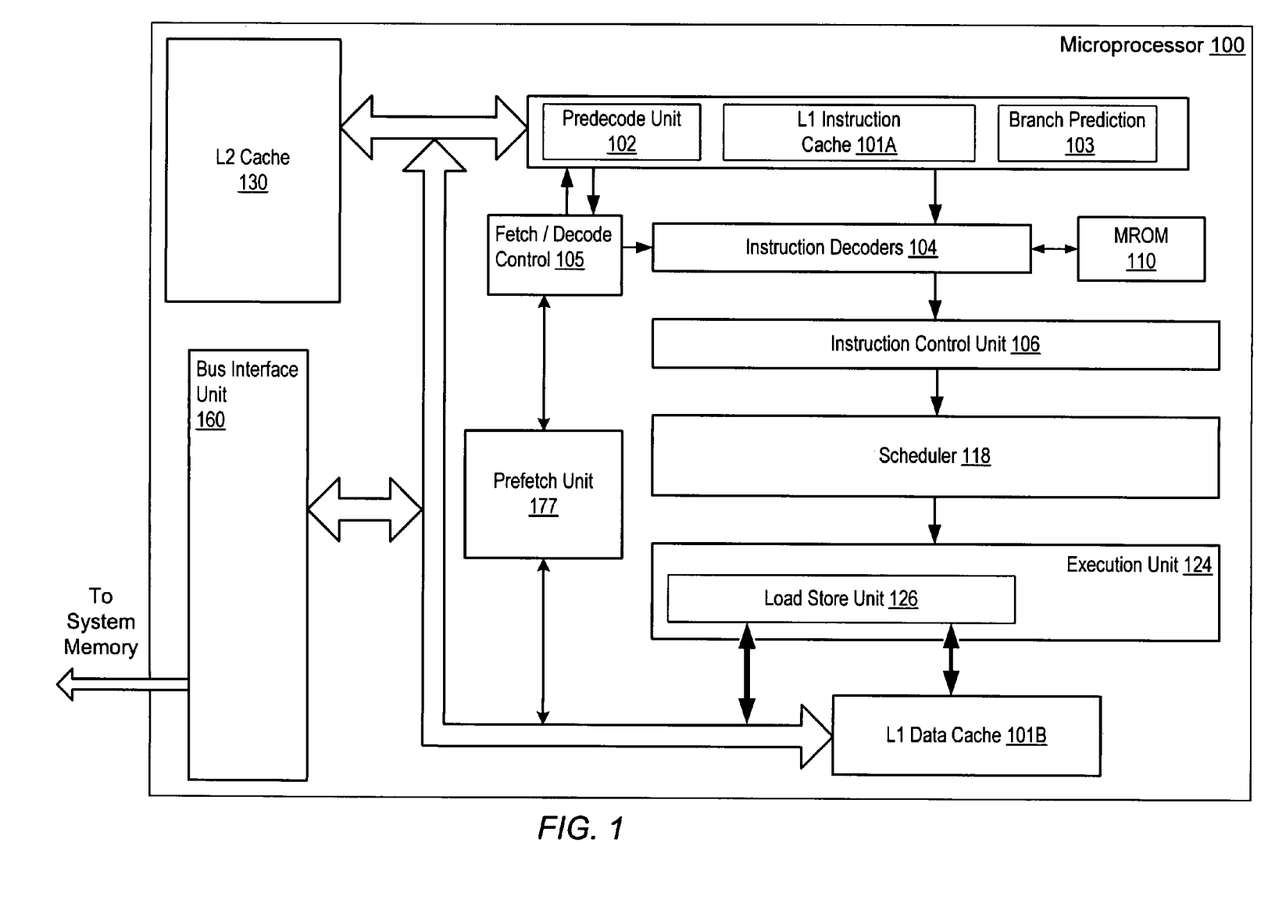
FIG. 1 is a block diagram of one embodiment of a microprocessor.

Turning now to FIG. 1, a block diagram of one embodiment of an exemplary microprocessor 100 is shown. Microprocessor 100 is configured to execute instructions stored in a system memory (not shown). Many of these instructions operate on data stored in the system memory. It is noted that the system memory may be physically distributed throughout a computer system and may be accessed by one or more microprocessors such as microprocessor 100, for example. In one embodiment, microprocessor 100 is an example of a microprocessor which implements the x86 architecture such as an Athlon™ processor, for example. However, other embodiments are contemplated which include other types of microprocessors.

In the illustrated embodiment, microprocessor 100 includes a first level one (L1) cache and a second L1 cache: an instruction cache 101A and a data cache 101B. Depending upon the implementation, the L1 cache may be a unified cache or a bifurcated cache. In either case, for simplicity, instruction cache 101A and data cache 101B may be collectively referred to as L1 cache 101 where appropriate. Microprocessor 100 also includes a pre-decode unit 102 and branch prediction logic 103 which may be closely coupled with instruction cache 101A. Microprocessor 100 also includes a fetch and decode control unit 105 which is coupled to an instruction decoder 104; both of which are coupled to instruction cache 101A. An instruction control unit 106 may be coupled to receive instructions from instruction decoder 104 and to dispatch operations to a scheduler 118. Scheduler 118 is coupled to receive dispatched operations from instruction control unit 106 and to issue operations to execution unit 124. Execution unit 124 includes a load/store unit 126 which may be configured to perform accesses to data cache 101B. Results generated by execution unit 124 may be used as operand values for subsequently issued instructions and/or stored to a register file (not shown). Microprocessor 100 includes an on-chip L2 cache 130 which is coupled between instruction cache 101A, data cache 101B and the system memory. Microprocessor 100 also includes a bus interface unit 160 coupled between the cache units and system memory. Microprocessor 100 further includes a prefetch unit 177 coupled to L1 cache 101 and L2 cache 130.

Instruction cache 101A may store instructions before execution. Functions which may be associated with instruction cache 101A may be instruction fetching (reads), instruction pre-fetching, instruction pre-decoding and branch prediction. Instruction code may be provided to instruction cache 106 by pre-fetching code from the system memory through buffer interface unit 140 or as will be described further below, from L2 cache 130. Instruction cache 101A may be implemented in various configurations (e.g., set-associative, fully-associative, or direct-mapped). In one embodiment, instruction cache 101A may be configured to store a plurality of cache lines where the number of bytes within a given cache line of instruction cache 101A is implementation specific. Further, in one embodiment instruction cache 101A may be implemented in static random access memory (SRAM), although other embodiments are contemplated which may include other types of memory. It is noted that in one embodiment, instruction cache 101A may include control circuitry (not shown) for controlling cache line fills, replacements, and coherency, for example.

Instruction decoder 104 may be configured to decode instructions into operations which may be either directly decoded or indirectly decoded using operations stored within an on-chip read-only memory (ROM) commonly referred to as a microcode ROM or MROM (not shown). Instruction decoder 104 may decode certain instructions into operations executable within execution unit 124. Simple instructions may correspond to a single operation. In some embodiments, more complex instructions may correspond to multiple operations.

Instruction control unit 106 may control dispatching of operations to the execution unit 124. In one embodiment, instruction control unit 106 may include a reorder buffer for holding operations received from instruction decoder 104. Further, instruction control unit 106 may be configured to control the retirement of operations.

The operations and immediate data provided at the outputs of instruction control unit 106 may be routed to scheduler 118. Scheduler 118 may include one or more scheduler units (e.g. an integer scheduler unit and a floating point scheduler unit). It is noted that as used herein, a scheduler is a device that detects when operations are ready for execution and issues ready operations to one or more execution units. For example, a reservation station may be a scheduler. Each scheduler 118 may be capable of holding operation information (e.g., bit encoded execution bits as well as operand values, operand tags, and/or immediate data) for several pending operations awaiting issue to an execution unit 124. In some embodiments, each scheduler 118 may not provide operand value storage. Instead, each scheduler may monitor issued operations and results available in a register file in order to determine when operand values will be available to be read by execution unit 124. In some embodiments, each scheduler 118 may be associated with a dedicated one of execution unit 124. In other embodiments, a single scheduler 118 may issue operations to more than one of execution unit 124.

In one embodiment, execution unit 124 may include an execution unit such as and integer execution unit, for example. However in other embodiments, microprocessor 100 may be a superscalar processor, in which case execution unit 124 may include multiple execution units (e.g., a plurality of integer execution units (not shown)) configured to perform integer arithmetic operations of addition and subtraction, as well as shifts, rotates, logical operations, and branch operations. In addition, one or more floating-point units (not shown) may also be included to accommodate floating-point operations. One or more of the execution units may be configured to perform address generation for load and store memory operations to be performed by load/store unit 126.

Load/store unit 126 may be configured to provide an interface between execution unit 124 and data cache 101B. In one embodiment, load/store unit 126 may be configured with a load/store buffer (not shown) with several storage locations for data and address information for pending loads or stores. The load/store unit 126 may also perform dependency checking on older load instructions against younger store instructions to ensure that data coherency is maintained.

Data cache 101B is a cache memory provided to store data being transferred between load/store unit 126 and the system memory. Similar to instruction cache 101A described above, data cache 101B may be implemented in a variety of specific memory configurations, including a set associative configuration. In one embodiment, data cache 101B and instruction cache 101A are implemented as separate cache units. Although as described above, alternative embodiments are contemplated in which data cache 101B and instruction cache 101A may be implemented as a unified cache. In one embodiment, data cache 101B may store a plurality of cache lines where the number of bytes within a given cache line of data cache 101B is implementation specific. Similar to instruction cache 101A, in one embodiment data cache 101B may also be implemented in static random access memory (SRAM), although other embodiments are contemplated which may include other types of memory. It is noted that in one embodiment, data cache 101B may include control circuitry (not shown) for controlling cache line fills, replacements, and coherency, for example.

L2 cache 130 is also a cache memory which may be configured to store instructions and/or data. In one embodiment, L2 cache 130 may be larger than L1 cache 101 and may store instructions and data which do not fit within L1 cache 101. In the illustrated embodiment, L2 cache 130 may be an on-chip cache and may be configured as either fully associative or set associative or a combination of both. However it is also noted that in other embodiments, L2 cache 130 may reside off-chip. In one embodiment, L2 cache 130 may store a plurality of cache lines. It is noted that L2 cache 130 may include control circuitry (not shown) for controlling cache line fills, replacements, and coherency, for example.

Bus interface unit 160 may be configured to provide a link from microprocessor 100 to an external input/output (I/O) device via a non-coherent I/O link, for example. In one embodiment, one such bus interface unit 160 may include a host bridge (not shown). In addition, bus interface unit 160 may provide links between microprocessor 100 and other microprocessors via coherent links. In one embodiment, bus interface unit 160 may include an interface (not shown) to any suitable interconnect structure, such as a packet-based interconnect compatible with HyperTransport™ Technology or a shared bus such as an EV-6 bus by Digital Equipment Corporation, for example. Bus interface unit 1600 may also be configured to transfer instructions and data between a system memory (not shown) and L2 cache 130 and between the system memory and L1 instruction cache 101A and L1 data cache 101B as desired. Further, in embodiments in which L2 cache 130 resides off-chip, bus interface 160 may include circuitry (not shown) for controlling accesses to L2 cache 130.

Prefetch unit 177 may be configured to receive L1 cache 101 access requests, receive L1 cache access miss indications, and forward L2 demand requests. As will be described in greater detail below in conjunction with the description of FIG. 2 through FIG. 3B, prefetch unit 177 may be configured to perform prefetches of addresses for storage within L1 cache 101 in response to receiving L1 cache 101 access requests which may be coincident with any predetermined ranges of addresses stored within entries of prefetch unit 177. Prefetch unit 177 may further calculate the predetermined ranges of addresses based upon previous L1 cache 101 accesses and L1 accesses resulting in misses.

Figure 2:
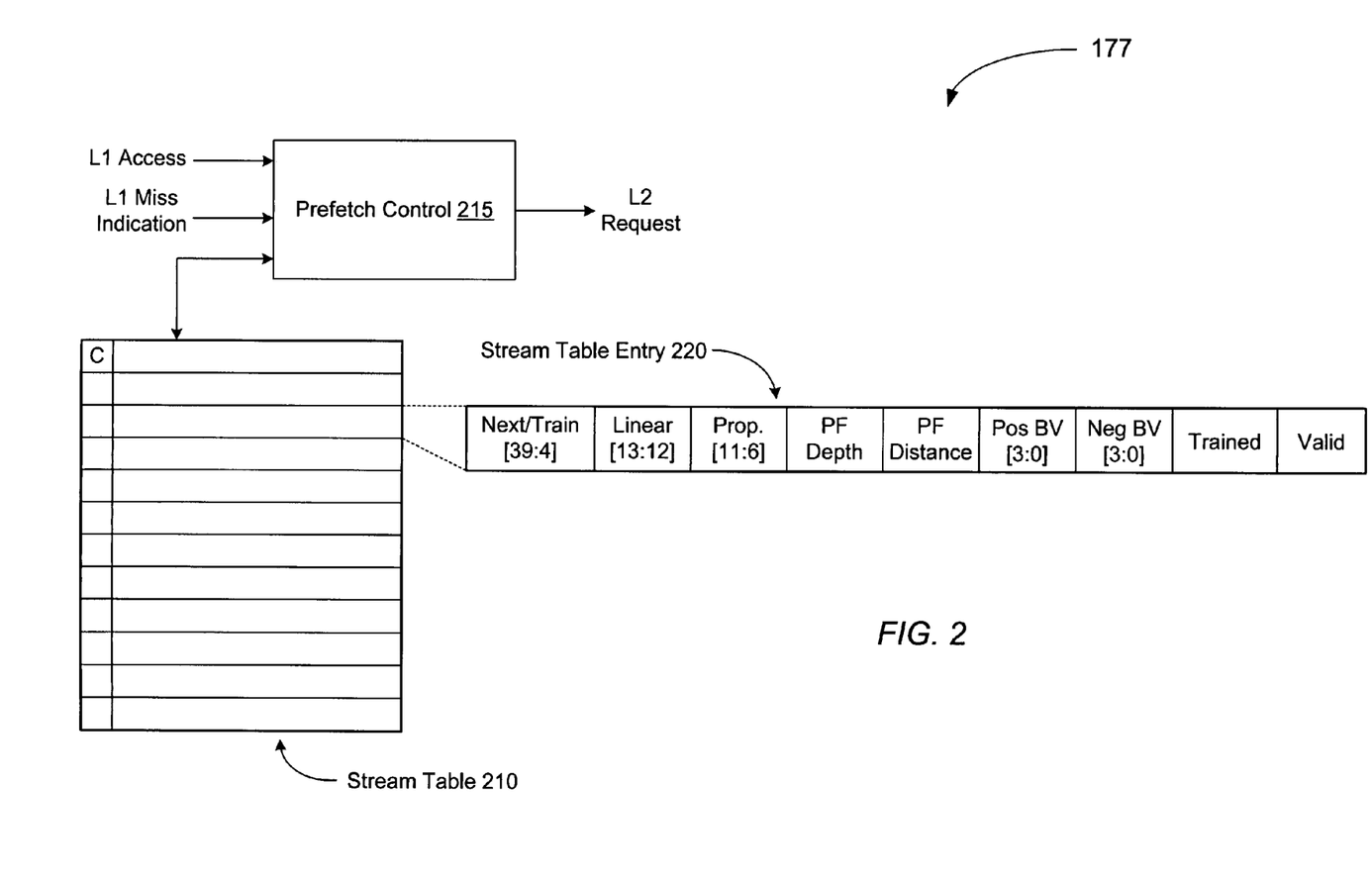
FIG. 2 is a block diagram of one embodiment of a prefetch unit.

Referring to FIG. 2, a block diagram of one embodiment of a prefetch unit is shown. Components that correspond to those shown in FIG. 1 are numbered identically for simplicity and clarity. Prefetch unit 177 is configured to receive L1 cache 101 access requests having a given address and to monitor and track requests which result in L1 misses. Prefetch unit 177 is also configured to receive an L1 miss indication corresponding to a given L1 access. Prefetch unit 177 includes a prefetch control 215 coupled to a stream table 210.

Generally speaking, prefetch unit 177 may be configured to monitor L1 accesses (i.e., L1 hits) and to prefetch addresses corresponding to those L1 accesses. Further, prefetch unit 177 may identify address streams associated with L1 access misses through a stream training mode. Once a stream is identified and an entry becomes a valid trained address stream, any accesses to L1 cache 101 which are coincident with the address range associated with that stream, may cause prefetch unit 177 to prefetch the data at a predetermined number of addresses into L1 cache 101. As described in greater detail below, in one embodiment, the number of addresses prefetched in response to any one access may be dynamically adjusted depending upon the accuracy of prefetch unit 177. Further, prefetch unit 177 may be configured to dynamically adjust how far ahead in the address stream to begin prefetching the addresses. Prefetch unit 177 may also be configured to minimize L1 cache pollution by refraining from prefetching any addresses if an access to an L1 cache 101 address is not within the range of addresses of any of the valid trained addresses.

Stream table 210 includes a plurality of storage locations for storing a plurality of entries. In one embodiment, an eight-entry table may be used, although it is contemplated that other embodiments may use any number of entries as desired. Each entry corresponds to an address stream having a range of addresses. An exemplary stream table entry 220 is shown. Each entry also includes a confidence counter as indicated by the 'C' in stream table 210.

In the illustrated embodiment, stream table entry 220 includes several fields. The first field, starting with the left-most field, is a Next/Train address field. The Next/Train address field holds an address value which corresponds to the address stream starting address that will be prefetched next for the stream corresponding to that entry.

The next field of stream table entry 220 is a Linear field which holds a value which corresponds to the linear addressing bits associated with addressing L1 cache 101.

The next field of stream table entry 220 is a Prop field which holds a value which corresponds to the starting address of the propagation region against which L1 accesses are compared to determine if a stream should be subsequently propagated.

The next field of stream table entry 220 is a PFDepth field which holds a value which corresponds to the number of bytes that will be prefetched during each prefetch. The PFDepth value may be increased incrementally dependent upon the value of the confidence count for that entry. In one embodiment, the default PFDepth value is 16 bytes, although it is contemplated that other embodiments may use other numbers of bytes.

The next field of stream table entry 220 is a PFDistance field which holds a count value corresponding to the number of bytes or "distance" ahead of the last address prefetched and the start of the next prefetch. In one embodiment, the PFDistance value may be initialized to 64 bytes and may be incremented in 64-byte steps, although it is contemplated that other embodiments may use other numbers of bytes. The PFDistance value and the PFDepth value may be used in calculating the Next Address.

The next field of stream table entry 220 is a PosBV field which corresponds to a bit vector including several bits. The PosBV field is used by prefetch unit 177 during training. In one embodiment, PosBV includes four bits and each bit corresponds to a 16-byte L1 cache line offset in a positive direction away from the Training address. It is noted that other embodiments are contemplated that include other numbers of bits and where each bit may correspond to other numbers of bytes. The next field is a NegBV field which also corresponds to a bit vector including several bits. The NegBV field is also used by prefetch unit 177 during training. In one embodiment, NegBV includes four bits and each bit corresponds to a 16-byte L1 cache line offset in a negative direction away from the Training address. It is noted that other embodiments are contemplated that include other numbers of bits and where each bit may correspond to other numbers of bytes.

The next field of stream table entry 220 is a Trained field. The Trained field holds a value indicative of whether the entry is trained or still in training. In one embodiment, setting this bit to a logic value of one is indicative that the entry is trained, although alternative embodiments are contemplated in which setting the bit to a logic value of zero may be indicative that the entry is trained. The last field of stream table entry 220 is a Valid field which holds a value indicative of whether the entry is a valid entry. If the entry is not valid, it may either be overwritten or it may become a candidate to be overwritten depending on the replacement algorithm used and how many such entries exist.

Although stream table 210 is described as a table, it is noted that in one embodiment, stream table 210 may be implemented using any storage medium such as a fully associative dedicated hardware memory unit, for example. In such an embodiment, the storage unit may implement a content addressable memory (CAM) for searching for matching entries. In other embodiments, stream table 210 may be implemented as a hardware accessible data structure such as a register set, for example.

As mentioned above, each entry in stream table 210 corresponds to a respective address stream including a range of addresses. To improve the accuracy of prefetched addresses and possibly minimize L1 cache pollution, prefetch control 215 may validate a given address stream by using a training protocol for each entry. By training each entry based upon misses in the L1 cache 101, prefetch control 215 may more accurately determine if a given access is really part of an address stream, thereby possibly increasing the accuracy of a prefetch. Accordingly, in response to receiving an L1 miss indication corresponding to a given L1 access, prefetch control 215 may either continue training an existing entry in stream table 210 or allocate a new entry. In response to receiving an access to L1 cache 101, prefetch unit 177 may either prefetch the data at one or more addresses or ignore the access depending on whether the access is coincident with the range of addresses associated with a given entry.

In addition, prefetch control 215 may dynamically adjust the number of bytes prefetched (i.e., prefetch depth) dependent upon how accurate the prefetches are determined to be. For example, in one embodiment, each time an access to L1 cache 101 matches an address range for a given entry, the confidence counter for that entry may be incremented. When the confidence count reaches a particular threshold, which may be programmable, the number of bytes prefetched may be increased.

Further, prefetch control 215 may be configured to dynamically adjust how far ahead of the propagation-region (i.e., prefetch distance) to start the next prefetch. For example, in one embodiment, prefetch control 215 may be configured to increase the prefetch distance of a given entry in response to determining that a previous prefetch is outstanding when another L1 cache 101 access request that matches the given entry is received.

Figure 3A:
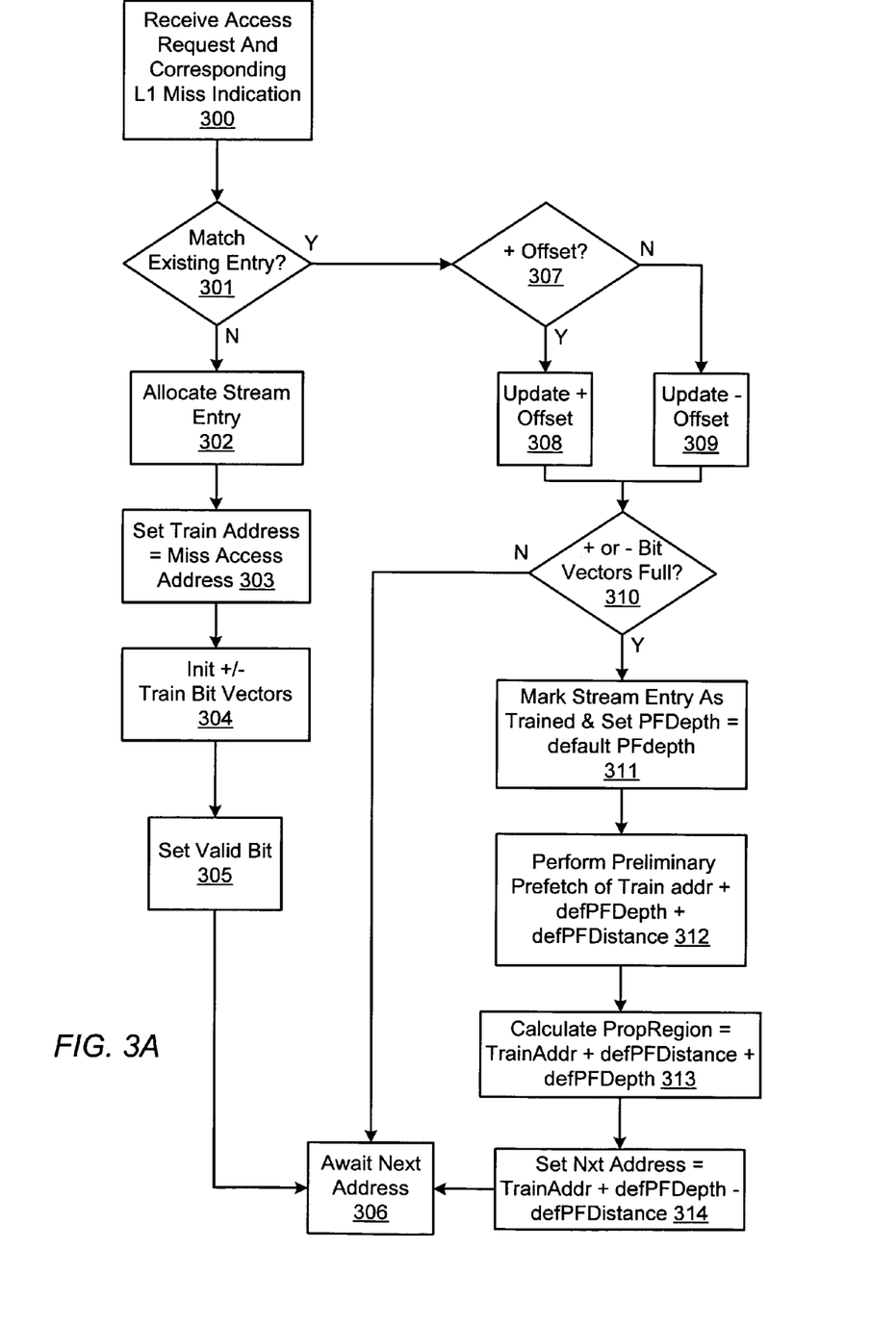
FIG. 3A is a flow diagram describing the operation of one embodiment of a prefetch unit during cache access misses.
Figure 3B:
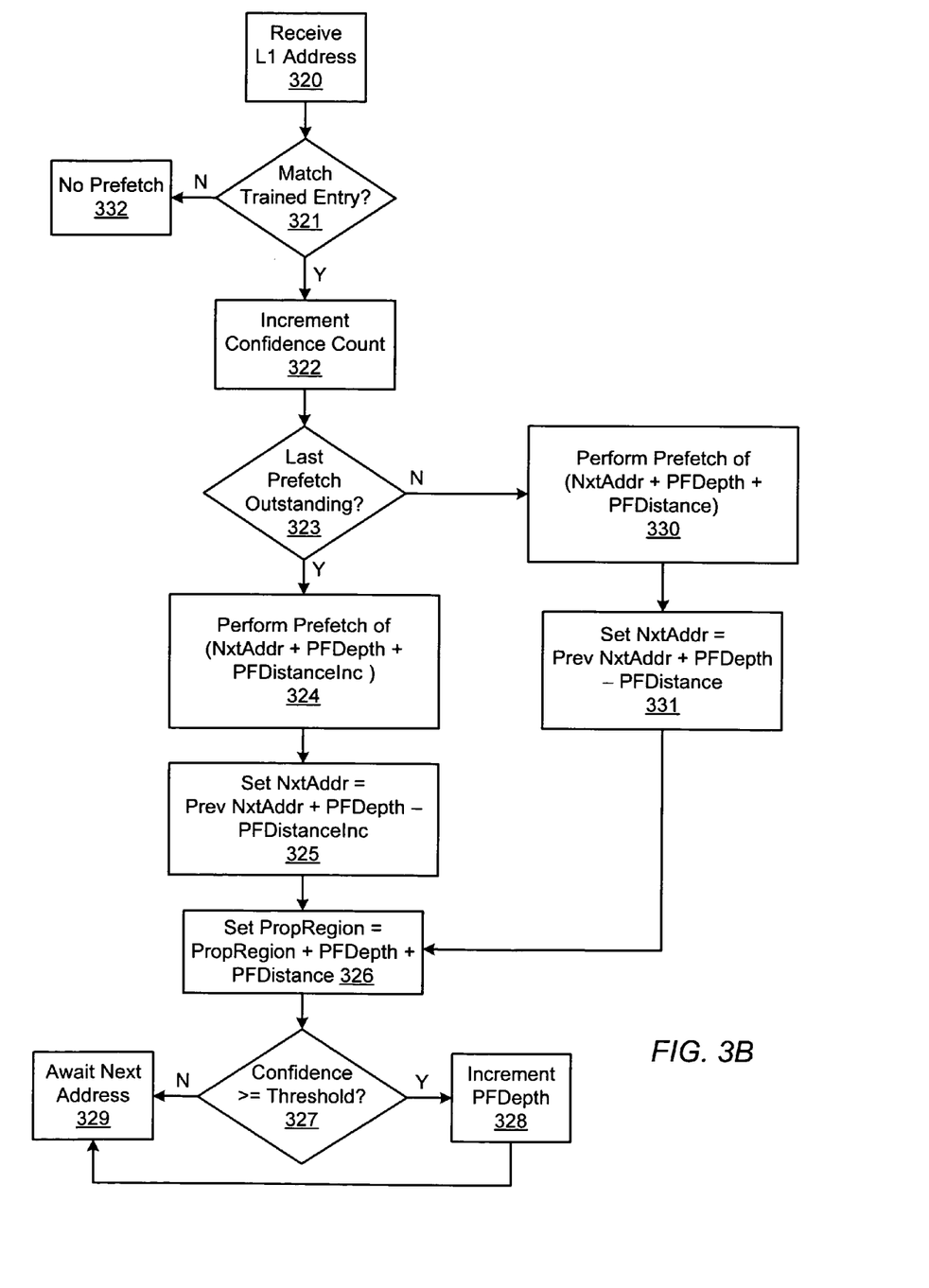
FIG. 3B is a flow diagram describing the operation of one embodiment of a prefetch unit during a cache access.

FIG. 3A and FIG. 3B collectively describe the operation of one embodiment of prefetch unit 177. FIG. 3A describes the training operation during cache access misses, while FIG. 3B describes the prefetching operation during cache accesses.

Referring collectively to FIG. 2 and FIG. 3A, prefetch control 215 receives an L1 miss indication corresponding to an L1 access which misses in the L1 cache (block 300). Prefetch control 215 compares the L1 access address to an address range of a training region of each of the entries in training (e.g., train bit clear) within stream table 210 (block 301). If there is no match, prefetch control 215 allocates an entry within stream table 210 (block 302). If there are no empty entries, prefetch control 215 may evict an existing entry. In one embodiment, a least recently used algorithm may be used. In another embodiment, the entry having the lowest confidence value may be evicted. Once an entry is allocated, prefetch control 215 may set the train address equal to the access address associated with the L1 miss (block 303). Prefetch control 215 may initialize the NegBV and the PosBV fields (block 304). In one embodiment, this may include clearing the bits to a logic value of zero. Prefetch control 215 may set the valid bit for the new entry (block 305) and then await another L1 miss indication and corresponding L1 access address (block 306).

Referring back to block 301, if an address associated with an L1 access miss matches an address range of a training region of an existing valid entry within stream table 210, prefetch control 215 determines if the L1 access address is a positive offset or a negative offset from the train address (block 307). If the offset is positive going, prefetch control 215 updates the PosBV by setting a bit corresponding to the amount of offset (block 308). For example, in one embodiment, the PosBV includes four bits [3:0] representing a 64-byte positive training region. The four bits represent four sequential 16-byte offsets from the train address. Accordingly, if the received L1 access miss address is within the first 16 bytes, bit zero may be set and if the received L1 access miss address is between byte 15 and byte 31, bit one may be set and so forth.

If however the offset is negative going, prefetch control 215 updates the NegBV by setting a bit corresponding to the amount of offset (block 309). For example, in one embodiment, the NegBV also includes four bits [3:0] representing a 64-byte negative training region. As above, the four bits represent four sequential 16-byte offsets from the train address.

Prefetch control 215 checks whether either the PosBV or NegBV have all bits set (block 310). If neither bit vector is full, prefetch control 215 waits for the next L1 access address associated with an L1 miss as described above in block 306. If either bit vector is full (i.e., all four bits are set), the entry is now trained. Prefetch control 215 may mark the entry as trained by setting the trained bit and may also initialize the PFDepth field to the default PFDepth value (e.g., 16 bytes) (block 311). Prefetch control 215 may initiate a preliminary prefetch (block 312). Prefetch control 215 may prefetch the number of bytes indicated by a default depth of defPFDepth beginning at Train address+a default PFDistance+defPFDepth. Prefetch control 215 may then calculate a Propagation Region value to cover these prefetched bytes (e.g., from Train address to Train address+defPFDistance+defPFDepth) (block 313). Prefetch control 215 may further calculate and set the next starting address to prefetch (e.g., NxtAddr) (block 314). In one embodiment, the Next address is equal to the Train address+defPFDepth−def PFDistance. As described above in block 306, prefetch control 215 awaits another L1 access address and L1 miss indication.

As described below in conjunction with the description of FIG. 3B, the matching entry is now trained and ready for use by prefetch control 215 in determining prefetch addresses in response to receiving an L1 access request.

Referring collectively to FIG. 2 through FIG. 3B, prefetch control 215 receives an L1 access request including an address (block 320). Prefetch control 215 compares the L1 access address to an address range of a propagation region (e.g., Prop. field) of each of the trained entries (i.e., train bit set) within stream table 210 (block 321). If there is no matching entry, the L1 access is ignored and no prefetch is performed (block 332).

Referring back to block 321, if the received L1 access address matches (i.e., is coincident with the Propagation Region of an entry) an entry within stream table 210, the confidence counter for the matching entry may be incremented (block 322). Prefetch control 215 may check whether there is an outstanding prefetch for this entry (block 323). If there are no outstanding prefetches for this entry, prefetch control 215 may perform a prefetch of the data at one or more addresses beginning with the address specified in the Next address field. The ending address is calculated using the number of bytes specified in the PFDepth field and the value in the PFDistance field. For example, prefetch control 215 may perform a prefetch of NxtAddr+PFDistance+PFDepth (block 330). Prefetch control 215 calculates and sets the next address to prefetch during the next prefetch cycle. In one embodiment, the Next address is equal to the previous Next address+PFDepth−PFDistance (block 331). Prefetch control 215 may also calculate the PropagationRegion value to be the addresses just prefetched (e.g., PropRegAddr+PFDepth+PFDistance) (block 326). Prefetch control 215 compares the confidence value for the entry against a threshold value (block 327). If the confidence value is greater than or equal to the threshold, the PFDepth value may be incremented (block 328). In one embodiment, the PFDepth value may be increased in increments of 16 bytes. Further, in other embodiments more than one threshold value may be used and depending on the confidence counter value, the PFDepth value may be increased more than one increment as desired. Prefetch control 215 may then await the next L1 access request (block 329).

Referring back to block 323, if prefetch control 215 determines that there is an outstanding prefetch for this entry at the time at which an L1 access hits on the PropagationRegion, prefetch control 215 may increment the PFDistance value and perform a prefetch of Next Addr+PFDepth+PFDistanceInc (block 324). Prefetch control 215 may calculate a new Next address. In one embodiment, the new Next address is the previous Next Address+PFDepth−PFDistanceInc (block 325). By incrementing the PFDistance value, which effectively increases the distance between the PropagationRegion and the next address to prefetch, prefetch control 215 may compensate for the latency associated with the outstanding prefetched address on the next prefetch. Operation then continues as described above at block 326.

Figure 4:
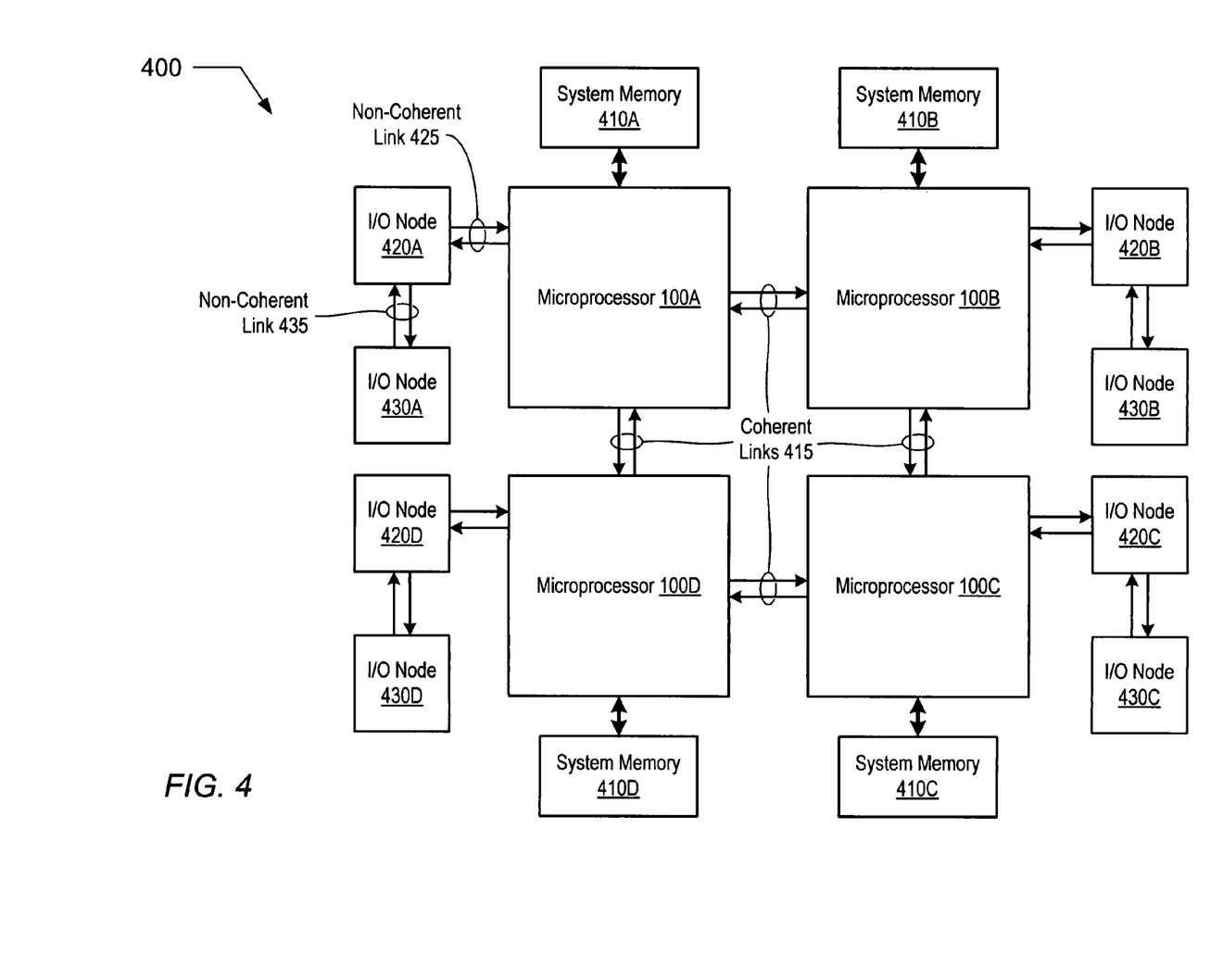
FIG. 4 is a block diagram of one embodiment of a computer system.

Turning to FIG. 4, a block diagram of one embodiment of an exemplary multiprocessor computer system including a microprocessor such as the microprocessor of FIG. 1 is shown. Components that correspond to those shown in FIG. 1 and FIG. 2 are numbered identically for clarity and simplicity. Computer system 400 includes four microprocessors, designated 100A through 100D. Each of microprocessors 100A-D are coupled to a respective system memory 410A-D. In addition, each of microprocessors 100A-D are coupled to an I/O node 420A-D, respectively via respective non-coherent I/O links 425. Further, each of microprocessors 100A-D is coupled together via coherent links 415. It is noted that although four microprocessors are shown, other embodiments are contemplated which may include other numbers of microprocessors.

In the illustrated embodiment, each of microprocessors 100A-D may include a prefetch unit 177 as described above in conjunction with the descriptions of FIG. 1-FIG. 3B. Further, in one embodiment, each of microprocessors 100A-D may include bus interface units 160 (not shown in FIG. 4) configured to provide links to other processors and to I/O nodes via coherent and non-coherent protocols, respectively. For example, microprocessor 100A-D may include a bus interface 160 for each coherent link 415 and for each non-coherent link 425. In one embodiment, the bus interface 160 coupled to non-coherent link 425 may include a host bridge (not shown). It is noted that in one embodiment, coherent links 415 and non-coherent links 425 and 435 may each be compatible with HyperTransport™ technology.

In the illustrated embodiment, system memory 410A-D may include any suitable memory devices. For example, system memory 410A-D may be implemented in any of the dynamic random access memory (DRAM) family of technologies. Further system memory 410A-D may employ one or more memory modules (not shown) which may plug into a motherboard (not shown) having sockets configured to accept the memory modules. The memory modules may include a plurality of memory integrated circuits (not shown) configured to store data. In one embodiment, the memory integrated circuits may be double data rate synchronous DRAM (DDRSDRAM) chips, although other embodiments are contemplated in which other types of memory chips may be used.

In the illustrated embodiment, I/O nodes 420A-D and I/O nodes 430A-D may be representative of any of a variety of I/O devices capable of bridging peripheral devices to non-coherent links 425 and 435. Further, I/O nodes 420A-D and I/O nodes 430A-D may also be configured to provide graphics capabilities as well as providing links to other networks via connections such as Ethernet connections, for example.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A prefetch unit comprising:
   a stream storage including a plurality of locations configured to store a plurality of entries, wherein each entry includes a field corresponding to a respective range of prefetch addresses; and
   a prefetch control coupled to said stream storage and configured to prefetch an address in response to receiving a cache access request including an address that is within said respective range of prefetch addresses of any of said plurality of entries;
   wherein said respective range of prefetch addresses corresponds to a range of addresses prefetched during a last prefetch cycle;
   wherein each of said plurality of entries includes a next address indicative of a prefetch starting address of a next prefetch, a prefetch depth value indicative of a number of bytes to prefetch and a prefetch distance value indicative of a number of bytes ahead of a propagation region;
   wherein said prefetch control is further configured to dynamically increment said prefetch depth value dependent upon a confidence count which is indicative of an accuracy of preceding prefetches; and
   wherein said prefetch control is further configured to dynamically increment said prefetch distance value dependent upon whether an outstanding prefetch exists during a subsequent prefetch cycle.

2. The prefetch unit as recited in claim 1, wherein said prefetch control is further configured to initialize a new entry of said plurality of entries and to establish a training address using an address corresponding to a first cache access request not matching any of said plurality of entries in response to receiving a miss indication corresponding to said first cache access request.

3. The prefetch unit as recited in claim 2, wherein said prefetch control is further configured to determine whether each of said plurality of entries is a valid address stream based upon a history of previous cache access requests each corresponding to a respective miss indication.

4. The prefetch unit as recited in claim 3, wherein each of said plurality of entries is determined to be a valid address stream in response to a predetermined number of said previous cache access requests having addresses that are within a predetermined range of addresses from said training address.

5. A microprocessor comprising:
   a cache subsystem including a cache storage configured to store a plurality of cache lines;
   a prefetch unit coupled to said cache subsystem, said prefetch unit comprising:
      a stream storage including a plurality of locations configured to store a plurality of entries, wherein each entry includes a field corresponding to a respective range of prefetch addresses; and
      a prefetch control coupled to said stream storage and configured to prefetch an address in response to receiving a cache access request to said cache storage including an address that is within said respective range of prefetch addresses of any of said plurality of entries;
   wherein said respective range of prefetch addresses corresponds to a range of addresses prefetched during a last prefetch cycle;
   wherein each of said plurality of entries includes a next address indicative of a prefetch starting address, a prefetch depth value indicative of a number of bytes to prefetch and a prefetch distance value indicative of a number of bytes ahead of a propagation region;
   wherein said prefetch control is further configured to dynamically increment said prefetch depth value dependent upon a confidence count which is indicative of an accuracy of preceding prefetches; and
   wherein said prefetch control is further configured to dynamically increment said prefetch distance value dependent upon whether an outstanding prefetch exists during a subsequent prefetch cycle.

6. The microprocessor as recited in claim 5, wherein said prefetch control is further configured to initialize a new entry of said plurality of entries and to establish a training address using an address corresponding to a first cache access request to said cache storage not matching any of said plurality of entries in response to receiving a miss indication corresponding to said first cache access request.

7. The microprocessor as recited in claim 6, wherein said prefetch control is further configured to determine whether each of said plurality of entries is a valid address stream based upon a history of previous cache access requests each corresponding to a respective miss indication.

8. The microprocessor as recited in claim 7, wherein each of said plurality of entries is determined to be a valid address stream in response to a predetermined number of said previous cache access requests having addresses that are within a predetermined range of addresses from said training address.

9. A method comprising:
   storing a plurality of entries, wherein each entry includes a field corresponding to a respective range of prefetch addresses;
   prefetching an address in response to receiving a cache access request including an address that is within said respective range of prefetch addresses of any of said plurality of entries;
   wherein said respective range of prefetch addresses corresponds to a range of addresses prefetched during a last prefetch cycle;
   wherein each of said plurality of entries includes a next address indicative of a prefetch starting address, a prefetch depth value indicative of a number of bytes to prefetch and a prefetch distance value indicative of a number of bytes ahead of a propagation region;
   dynamically incrementing said prefetch depth value dependent upon a confidence count which is indicative of an accuracy of preceding prefetches; and
   dynamically incrementing said prefetch distance value dependent upon whether an outstanding prefetch exists during a subsequent prefetch cycle.

10. The method as recited in claim 9 further comprising initializing a new entry of said plurality of entries and establishing a training address using an address corresponding to a first cache access request not matching any of said plurality of entries in response to receiving a miss indication corresponding to said first cache access request.

11. The method as recited in claim 10 further comprising determining whether each of said plurality of entries is a valid address stream based upon a history of previous cache access requests each corresponding to a respective miss indication.

12. The method as recited in claim 11, wherein each of said plurality of entries is determined to be a valid address stream in response to a predetermined number of said previous cache access requests having addresses that are within a predetermined range of addresses from said training address.

* * * * *